United States Patent
Seidler et al.

(10) Patent No.: US 10,479,423 B2
(45) Date of Patent: Nov. 19, 2019

(54) UNDERBODY PANEL FOR A MOTOR VEHICLE, IN PARTICULAR PASSENGER VEHICLE, AND MOTOR VEHICLE HAVING AN UNDERBODY PANEL

(71) Applicant: Daimler AG, Stuttgart (DE)

(72) Inventors: Uwe Seidler, Boeblingen (DE); Xiao Fei, Aachen (DE)

(73) Assignee: Daimler AG, Stuttgart (DE)

( * ) Notice: Subject to any disclaimer, the term of this patent is extended or adjusted under 35 U.S.C. 154(b) by 131 days.

(21) Appl. No.: 15/742,826

(22) PCT Filed: Jul. 1, 2016

(86) PCT No.: PCT/EP2016/001123
§ 371 (c)(1),
(2) Date: Jan. 8, 2018

(87) PCT Pub. No.: WO2017/005351
PCT Pub. Date: Jan. 12, 2017

(65) Prior Publication Data
US 2018/0162460 A1    Jun. 14, 2018

(30) Foreign Application Priority Data
Jul. 9, 2015   (DE) .......... 10 2015 008 892

(51) Int. Cl.
*B60J 9/00* (2006.01)
*B62D 35/02* (2006.01)
*B62D 25/18* (2006.01)

(52) U.S. Cl.
CPC ............. *B62D 35/02* (2013.01); *B62D 25/18* (2013.01); *Y02T 10/88* (2013.01)

(58) Field of Classification Search
CPC .... B62D 35/02; B62D 25/2036; B62D 37/02; B62D 25/20; Y02T 10/88; B60K 1/04; F41H 7/044
USPC ............... 296/180.5, 180.1, 193.07, 204; 1/1
See application file for complete search history.

(56) References Cited

U.S. PATENT DOCUMENTS

| 3,618,998 A * | 11/1971 | Swauger ............... B62D 35/005 |
|---|---|---|
| | | 280/762 |
| 4,159,140 A * | 6/1979 | Chabot ................ B62D 35/005 |
| | | 105/1.3 |
| 7,040,690 B2 * | 5/2006 | Soja ..................... B62D 35/005 |
| | | 296/180.5 |

(Continued)

FOREIGN PATENT DOCUMENTS

| DE | 10 2010 004 532 A1 | 8/2010 |
|---|---|---|
| DE | 10 2013 219 212 A1 | 3/2015 |

OTHER PUBLICATIONS

PCT/EP2016/001123, International Search Report dated Sep. 12, 2016 (Two (2) pages).

*Primary Examiner* — Kiran B Patel
(74) *Attorney, Agent, or Firm* — Crowell & Moring LLP

(57) ABSTRACT

An underbody panel for a motor vehicle, in particular a passenger vehicle, has at least one first underbody panel element which is arranged in a region of a pivotable vehicle wheel and moves with the wheel during a pivoting movement of the wheel and at least one second underbody panel element which is arranged in the region of the wheel and which is pivotable with the wheel during a pivoting movement of the wheel in the opposite direction.

8 Claims, 1 Drawing Sheet

(56) References Cited

U.S. PATENT DOCUMENTS

| | | | | |
|---|---|---|---|---|
| 8,297,685 | B2 * | 10/2012 | Wolf | B62D 35/005 |
| | | | | 296/180.1 |
| 8,702,152 | B1 * | 4/2014 | Platto | B62D 35/005 |
| | | | | 296/180.1 |
| 9,908,563 | B2 * | 3/2018 | Nishiura | B62D 25/161 |
| 2012/0104793 | A1 * | 5/2012 | Danielson | B62D 29/046 |
| | | | | 296/181.1 |
| 2015/0048648 | A1 * | 2/2015 | Wolf | B62D 25/16 |
| | | | | 296/180.5 |
| 2017/0297637 | A1 * | 10/2017 | Shinedling | B62D 35/02 |
| 2017/0349224 | A1 * | 12/2017 | Logounov | B62D 35/001 |
| 2018/0265142 | A1 * | 9/2018 | Titus | B60T 1/16 |

* cited by examiner

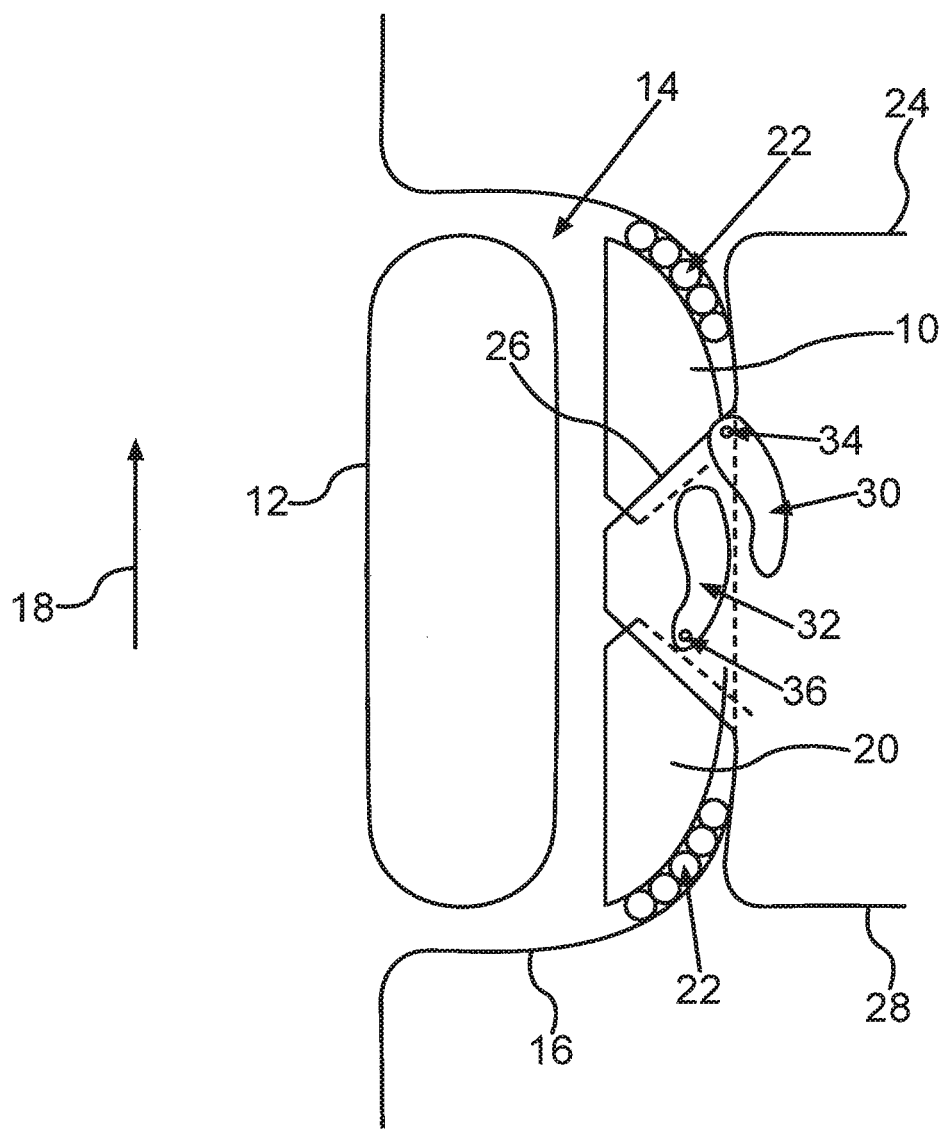

UNDERBODY PANEL FOR A MOTOR VEHICLE, IN PARTICULAR PASSENGER VEHICLE, AND MOTOR VEHICLE HAVING AN UNDERBODY PANEL

BACKGROUND AND SUMMARY OF THE INVENTION

The invention relates to an underbody panel for a motor vehicle, in particular a passenger vehicle.

Such an underbody panel for a motor vehicle is already known, for example, from DE 10 2010 004 532 A1. The underbody panel has at least one underbody panel element which is arranged in the region of a pivotable vehicle wheel of the motor vehicle and is pivotable with this wheel during a pivoting movement of the vehicle. The underbody panel element is then thereby pivoted with the vehicle wheel both when the vehicle wheel is pivoted around its steering axis in a first pivot direction and when the vehicle wheel is pivoted, i.e., steered, around its pivot axis in a second pivot direction which is opposite to the first pivot direction.

Additionally, DE 10 2013 219 212 discloses an underbody panel part of a wheel axle in the wheel housing of a motor vehicle, having a main body whose covering surface can be changed and which has a fastening structure for fixed connection to the body and/or a fastening structure for fixed connection to a wishbone of the vehicle.

The object of the present invention is to create an underbody panel of the aforementioned type, by means of which especially advantageous aerodynamics can be achieved.

In order to create an underbody panel of the abovementioned type, by means of which particularly advantageous aerodynamics of the vehicle can be achieved, at least one second underbody panel element is provided according to the invention which is arranged in the region of the vehicle wheel and is pivotable with this wheel in the opposite direction to the first underbody panel element during a pivoting movement of the vehicle wheel. The underbody panel elements are thus pivotable relative to each other. It can thus be avoided that both underbody panel elements are always moved during pivoting or steering movements of the vehicle wheel, but rather always only one of the underbody panel elements is moved. If, for example, the vehicle wheel is pivoted around the steering axis in a first pivot direction, then the first underbody panel element, for example, will thus be moved, for example pivoted, with the vehicle wheel, while the second underbody panel element will not be moved and preferably remains in its position, which it assumes when the vehicle wheel is positioned for straight driving. Both the vehicle wheel and the first underbody panel element are thus moved relative to the second underbody panel element.

If the vehicle wheel is, for example, pivoted around its steering axis in a second pivot direction which is opposite to the first pivot direction, then, for example, not the first underbody panel element but the second underbody panel element will be moved, preferably pivoted, with the wheel, so that both the vehicle wheel and the second underbody panel element are moved, preferably pivoted, relative to the first underbody panel element. The number of load changes can be halved in comparison to a one-piece underbody panel element which is moved during every pivoting movement of the vehicle wheel, since always only one of the underbody panel elements is moved or in motion during a pivoting movement or a steering lock of the vehicle wheel. Respective lengths of sealing surfaces, by means of which the underbody panel elements are sealed, for example, against components of the motor vehicle adjoining the underbody panel elements, can thereby be reduced so that an especially advantageous and effective sealing of the underbody panel elements against the components can be realized. In this way, unfavorable air turbulence can be avoided, so that the air resistance and thus the aerodynamics of the motor vehicle can be improved compared to a one-piece underbody panel element which pivots during every pivoting movement of the vehicle wheel. As a result, the energy consumption and thus, for example, the fuel consumption of the motor vehicle can be kept low. With the abovementioned components, there are, for example, parts or regions of a wheel-housing shell, also referred to as a fender skirt, against which the underbody panel elements can be sealed especially effectively. An aerodynamic optimization of the motor vehicle can thus be achieved.

The object of the present invention is also to create a motor vehicle of the aforementioned type which has especially advantageous aerodynamics.

To solve this object, a motor vehicle has at least one underbody panel, which comprises at least one underbody panel element which is arranged in the region of a pivotable vehicle wheel and moves with this wheel during a pivoting movement. At least one second underbody panel element which is arranged in the region of the vehicle wheel is furthermore provided. According to the invention, the first underbody element is moveable relative to the second underbody panel element by means of steering the vehicle wheel in a first direction, while the second underbody panel element is moveable relative to the first underbody panel element by means of steering the vehicle in a second direction which is opposite to the first direction.

Advantageous embodiments of the motor vehicle with advantageous developments of the invention are specified in the remaining claims.

Further advantages, features and details of the invention arise from the following description of a preferred exemplary embodiment as well as from the drawing.

BRIEF DESCRIPTION OF THE DRAWING

The single FIGURE shows a schematic bottom view of an underbody panel for a motor vehicle in the form of a passenger vehicle.

DETAILED DESCRIPTION OF THE DRAWING

The underbody panel has a first underbody panel element 10, which is arranged in the region of a pivotable vehicle wheel 12 of the passenger vehicle. The vehicle wheel 12 is a wheel, in particular a front wheel, of an axle, in particular a front axle, of the passenger vehicle. It can be seen from the FIGURE that the vehicle wheel 12 is arranged at least partially in a wheel housing 14, wherein the wheel housing 14 is limited at least partially by a wheel-housing shell 16. In the FIGURE, the forward direction of travel of the passenger vehicle is illustrated by a directional arrow 18. A first portion of the wheel housing 14, in which the vehicle wheel 12 is at least partially accommodated, can be covered downwards in the vehicle direction by means of the first underbody panel element 10.

In order to enable direction change and cornering of the passenger vehicle, the vehicle wheel 12 is steerable and is thus pivotable around a steering axis which is not illustrated in the FIGURE. Pivoting movements of the vehicle wheel 12 around its steering axis can be effected, for example, by the driver of the passenger vehicle activating a steering handle, particularly in the form of a steering wheel.

During a pivoting movement of the vehicle wheel 12 the first underbody panel element 10 is moveable, preferably pivotable, with this wheel during a pivoting movement. If, in the present case, the vehicle wheel 12 is pivoted clockwise around its steering axis relative to the image plane of the FIGURE, the first underbody panel element 10 will also be pivoted clockwise with the vehicle wheel 12. The underbody panel element 10 can thus cover an especially large portion of the wheel housing 14, in particular when the passenger vehicle is driving straight ahead, wherein collisions between the vehicle wheel 12 and the first underbody panel element 10 can simultaneously be avoided when the vehicle wheel 12 is pivoted clockwise and thus is pivoted around the steering axis in a first pivot direction.

In order to now implement a particularly advantageous aerodynamics of the passenger vehicle, the underbody panel comprises a second underbody panel element 20 which is arranged in the region of the vehicle wheel 12, which is moveable, preferably pivotable, in the opposite direction to the first underbody panel element 10 during a pivoting movement of the vehicle wheel 12.

If the vehicle wheel 12 is pivoted around its steering axis counter-clockwise and thus around the steering axis in a second pivoting direction which is opposite to the first pivoting direction, the second underbody panel element 20 is thus moved with the vehicle wheel 12. A further, especially larger portion of the wheel housing 14 can thus be covered downwards by the second underbody panel element 20 in the vertical direction of the vehicle, wherein collisions between the vehicle wheel 12 and the second underbody panel element 20 can simultaneously be avoided if the vehicle wheel 12 is pivoted or steered in the second pivoting direction. The underbody panel elements 10 and 20 are thus moveable, in particular pivotable, relative to each other and in opposite directions. If the vehicle wheel 12 is pivoted in the first pivoting direction, then both the vehicle wheel 12 and the first underbody panel element 10 are moved relative to the second underbody panel element 20, while this element is preferably stationary or is not pivoted. If however the vehicle wheel 12 is pivoted in the second pivot direction, then both the vehicle wheel 12 and the second underbody panel element 20 are thus moved relative to the first underbody panel element, preferably are pivoted, with the first underbody panel element preferably being stationary or not being pivoted. The return of the respective underbody panel elements 10 or 20 during a return of the steering wheel 12 which has been turned to its position for when the vehicle is driving straight ahead is preferably carried out by means of a spring element, which acts on the respective underbody panel element 10 or 20 at least in a deflected state with a resetting force.

In comparison to a one-piece or one-part underbody panel part which is pivotable with the vehicle wheel 12 and pivots during every pivoting movement of the vehicle wheel 12, the number of load changes acting on the respective underbody panel elements 10 and 20 can be halved, since when there is a steering lock of the vehicle wheel 12, only one of the underbody panel elements 10 and 20 is in motion. It is furthermore possible to thus keep the length of respective sealing surfaces 22 low, so that an especially effective sealing of the underbody panel element 10 and 20 against adjoining further components of the passenger vehicle can be achieved.

In the present case, one of the these components is the wheel-housing shell 16, against which the underbody panel elements 10 and 20 are sealable or sealed via the respective sealing surfaces 22. By this sealing, joints or gaps between the underbody panel elements 10 and 20 and the wheel-housing shell 16 can be sealed, so that excessive air turbulence impairing the aerodynamics, in particular the air resistance, of the passenger vehicle, can be avoided.

The two underbody panel elements 10 and 20, which are moveable independently of each other, are substantially of plate-shaped design, yet can have a certain degree of flexibility and are nevertheless at least substantially of dimensionally stable construction.

A further one of these components is, for example, a third, fixed underbody panel element 24 of the underbody panel, which is of plate-shaped design and preferably extends between the wheel-housing 14 illustrated in the FIGURE and the wheel housing which cannot be seen in the FIGURE. It can be seen in the FIGURE that the third underbody panel element 24 has a projection 26, which is arranged at least partially in the vehicle direction between the underbody panel elements 10 and 20. A main body 28 of the third underbody panel element 24 inwardly adjoins the projection 26 in the vehicle transverse direction, wherein the projection 26 projects outwardly from the main body 28 in the vehicle transverse direction. The main body 28 is thus formed in one piece with the projection 26. For example, an engine compartment of the passenger vehicle which cannot be seen in the FIGURE is at least partially covered downwards in the vehicle direction by means of the main body 28. It should be noted that the projection 26 which protrudes into the wheel housing 14 up to near the front wheel 12 is here at least substantially trapezoidal in shape. The position of the projection 26 within the wheel housing 14 is therefore fixed. Such a projection 26 is preferably provided on the side of the underbody panel element 24 which faces the other wheel housing.

The underbody panel elements 10 and 20 which are likewise plate-shaped are moving parts of the underbody panel, wherein the third underbody panel element 24 is, in contrast, a fixed part of the underbody panel. This means that the underbody panel elements 10 and 20 are moveable relative to the underbody panel element 24, preferably are pivotable. The underbody panel element 24, in particular the projection 26, is determined in particular in terms of its geometry by the wheel envelope, in order to avoid collisions of the vehicle wheel 12 with the projection 26 when the vehicle wheel 12 is pivoted. From the FIGURE it can clearly be seen that the projection 26 projects at least partially into or under the wheel housing 14, so that a further portion of the wheel housing 14 is covered by the projection 26 in the vehicle direction downwards. The two moving parts in the shape of the underbody panel elements 10 and 20 cover respective portions in the longitudinal vehicle direction in front of and behind the projection 26 or the fixed part.

It is clear from the FIGURE that the moving underbody panel elements 10 and 20 are arranged above the stationary underbody panel element 24 or the projection 26 and are also partially in overlap with the projection 26 when the vehicle is driving straight ahead.

An especially simple guiding of the moving parts (underbody panel elements 10 and 20) can be achieved by using the moving underbody panel elements 10 and 20 and the underbody panel element 24 which, in contrast, is fixed, or the projection 26, since the underbody panel elements 10 and 20 are, for example, attached to the fixed underbody panel element 24. This means that the underbody panel elements 10 and 20 are, for example, rotatably held on the underbody panel element 24. Alternatively or additionally, it is conceivable that the underbody panel elements 10 and 20 are guided onto the third underbody panel element, in particular the projection 26, at least during their pivoting movements. The underbody panel element 24 has guide tracks 30 and 32 for this purpose. The underbody panel element 10 has a guide element in the form of a peg 34 which engages in the corresponding guide track 30, so that the underbody panel element 10 is thus guided onto the underbody panel element 24. Correspondingly, the underbody panel element 20 has a further guide element in the form of a peg 36, which engages in the corresponding guide track 32. The underbody panel element 20 is thus guided onto the underbody panel element 24.

It should be noted that in the example embodiment of the underbody panel illustrated in the FIGURE, the moving underbody panel elements 10, 20 are each attached to the stationary underbody panel element 24 by means of a slotted guide. Depending on the design or shaping of the respective guide track 30, 32, the respective underbody panel element 10, 20 is pivoted during a pivoting of the front wheel and optionally also moves in an overlapping translational manner relative to the stationary underbody panel element 24.

Due to the particularly good distribution of the underbody panel at least in the fixed underbody panel element 24 and the moving underbody panel elements 10 and 20, as can be seen in the FIGURE, only, for example, the fixed underbody panel element 24 is attached, for example, to the resilient axle of the passenger vehicle.

For the functioning of the underbody panel according to the invention: In an initial position of the vehicle wheel 12, which it assumes when the vehicle is driving straight ahead and which is illustrated in the FIGURE, the respective moving underbody panel elements 10, 20 which are arranged in a non-deflected initial position, as well as the non-moving third underbody panel element 24 or its projection 26 which protrudes into the wheel housing 14, cover a majority of the wheel housing space between vehicle wheel and wheel-housing shell and hence also a steering linkage, a wheel suspension and the like toward the road surface. During a clockwise pivot of the vehicle wheel 12 according to the illustration of the FIGURE, the first underbody panel element 10 is moved in order to create space for the vehicle wheel pivoting inwards, while the second underbody panel element 20 remains in its initial position as shown in the FIGURE. The movement direction of the underbody panel element 10 is determined by the slotted guide, in particular by the shape or the course of the guide rail 30. During a return of the vehicle wheel 12 from the deflected position back to its straight-ahead position, a return of the first underbody panel element 10 to its initial position as shown in the FIGURE is carried out. During a counter-clockwise pivot of the vehicle wheel 12 according to the illustration in the FIGURE, the second underbody panel element 20 is thereby moved to create space for the vehicle wheel pivoting inwards, while the first underbody panel element 10 remains in its initial position shown in the FIGURE. The movement direction of the underbody panel element 20 is determined by the shape or the course of the guide track 32. During a return of the vehicle wheel 12 from the deflected position back to its straight-ahead position, a return of the second underbody panel element 20 to its initial position as shown in the FIGURE is carried out.

It should be noted that the moving underbody panel elements 10, 20 are at least indirectly coupled with the vehicle wheel 12 and/or wheel suspension elements or check rail or the like, so that a deflection of the same is carried out during a turning of the vehicle wheel 12. The return of the respective deflected or outward pivoted underbody panel element 10, 20 to its initial position during a turning of the vehicle wheel 12 in its straight-ahead position can be carried out either exclusively by the at least indirect coupling of the underbody panel element 10, 20 with the vehicle wheel or the like, but also additionally or alternatively assisted by spring force.

The invention claimed is:

1. An underbody panel for a motor vehicle, comprising:
    a first underbody panel element which is disposed in a region of a pivotable vehicle wheel and which is movable with the pivotable vehicle wheel during a first pivoting movement of the pivotable vehicle wheel in a first direction; and
    a second underbody panel element which is disposed in the region of the pivotable vehicle wheel and which is movable with the pivotable vehicle wheel during a second pivoting movement of the pivotable vehicle wheel in a second direction, wherein the second direction is opposite to the first direction.

2. The underbody panel according to claim 1 further comprising a third underbody panel element, wherein the third underbody panel element is fixed and is disposed in a vehicle direction at least partially between the first underbody panel element and the second underbody panel element.

3. The underbody panel according to claim 2, wherein the first underbody panel element and the second underbody panel element are guided onto the third underbody panel element during respective movements of the first underbody panel element and the second underbody panel element.

4. The underbody panel according to claim 2, wherein the first underbody panel element and the second underbody panel element are each moveably held on the third underbody panel element.

5. The underbody panel according to claim 2, wherein the first underbody panel element and the second underbody panel element are each held on the third underbody panel element during respective movements of the first underbody panel element and the second underbody panel element by a slotted guide.

6. The underbody panel element according to claim 1, wherein the first underbody panel element and the second underbody panel element are uncoupled from each other during respective movements of the first underbody panel element and the second underbody panel element.

7. A motor vehicle, comprising:
    an underbody panel, wherein the underbody panel includes:
        a first underbody panel element which is disposed in a region of a pivotable vehicle wheel; and
        a second underbody panel element which is disposed in the region of the pivotable vehicle wheel;
        wherein the first underbody panel element is moveable relative to the second underbody panel element by steering of the pivotable vehicle wheel in a first direction;
        wherein the second underbody panel element is moveable relative to the first underbody panel element by steering of the pivotable vehicle wheel in a second direction, wherein the second direction is opposite to the first direction.

8. The motor vehicle according to claim 7:
    wherein in a position of the pivotable vehicle wheel for a straight-line journey of the motor vehicle, the first underbody panel element and the second underbody panel element are each disposed in an initial position;

wherein when the pivotable vehicle wheel is steered in the first direction only the first underbody panel element is moved out of its respective initial position and the second underbody panel element remains in its respective initial position;

wherein when the pivotable vehicle wheel is steered in the second direction only the second underbody panel element is moved out of its respective initial position and the first underbody panel element remains in its respective initial position.

* * * * *